United States Patent [19]

Tanioka et al.

[11] Patent Number: 4,706,128
[45] Date of Patent: Nov. 10, 1987

[54] IMAGE READING AND CONVERTING APPARATUS

[75] Inventors: Hiroshi Tanioka, Tokyo; Yoshitaka Ogino, Kawasaki; Yutaka Inoue, Urawa; Masataka Naito; Kimiaki Hayakawa, both of Yokohama, all of Japan

[73] Assignee: Canon Kabushiki Kaisha, Tokyo, Japan

[21] Appl. No.: 679,237

[22] Filed: Dec. 7, 1984

[30] Foreign Application Priority Data

Dec. 14, 1983 [JP] Japan ................................ 58-234168
Jan. 27, 1984 [JP] Japan ................................ 59-12098

[51] Int. Cl.$^4$ ......................... H04N 1/04; H04N 1/10
[52] U.S. Cl. .................................... 358/286; 358/287; 358/293; 346/76 P H
[58] Field of Search ............... 358/286, 294, 293, 296, 358/256, 213, 300, 287; 250/209, 214 A, 578; 178/30; 346/76 P H

[56] References Cited

U.S. PATENT DOCUMENTS

| | | | |
|---|---|---|---|
| 4,317,137 | 2/1982 | Tompkins | 358/286 |
| 4,319,283 | 3/1982 | Ozawa et al. | 358/286 |
| 4,356,347 | 10/1982 | Wiener | 178/30 |
| 4,466,020 | 8/1984 | O'Connell | 358/293 |
| 4,514,737 | 4/1985 | Suzuki | 348/76 P H |
| 4,521,812 | 6/1985 | Knop | 358/287 |
| 4,523,235 | 6/1985 | Rajchman | 358/256 |
| 4,549,223 | 10/1982 | Ozawa | 358/300 |

OTHER PUBLICATIONS

L. L. Wu; Document Reader and Printer; Apr. 1974; IBM Technical Disclosure Bulletin; vol. 16, No. 11, pp. 3365-3369.

Primary Examiner—James J. Groody
Assistant Examiner—John K. Peng
Attorney, Agent, or Firm—Fitzpatrick, Cella, Harper & Scinto

[57] ABSTRACT

There is provided an image forming apparatus comprising: a readout sensor for reading out an original which is illuminated by a light source; a converter for converting image information which is read out by the readout sensor to a binary signal; printing heads for recording the image information on a recording paper in response to an output of the converter; and a driver for relatively carrying the readout sensor with regard to the original or recording paper. A plurality of sets of those readout sensors, converters and printing heads are arranged in a line on the same substrate. An amount of scan movement of this apparatus is detected and the driving operations of the light source and the image readout sensor or printing head are synchronized for every unit moving amount, so that occurrence of variation in concentration of the reproduced image and a risk of fire can be prevented. Also, a remarkable energy saving effect can be obtained in case of driving the apparatus by a battery.

17 Claims, 14 Drawing Figures

IMAGE READING AND CONVERTING APPARATUS

BACKGROUND OF THE INVENTION

1. Field of the Invention

The present invention relates to an image forming apparatus.

2. Description of the Prior Art

Conventionally, in image forming apparatuses, for example, in a copying apparatus or the like, an elongated copy head in which a sensor for reading out an image of an equal magnification and a printing device are integrally formed has been proposed in order to miniaturize the apparatus.

However, in order to realize a small-sized copier using the above copy head, a suitable image processing circuit is needed between the readout sensor and the printing device, causing the drawback of an increase in the cost and size of the apparatus.

SUMMARY OF THE INVENTION

It is an object of the present invention to eliminate the above-mentioned drawback.

Another object of the invention is to improve an image readout apparatus.

Another object of the invention is to improve an image forming apparatus.

Another object of the invention is to provide an image readout apparatus having an image processing circuit.

Another object of the invention is to provide a portable image forming apparatus in which image readout means and recording means are arranged on the same substrate.

Another object of the invention is to provide an image forming apparatus which can eliminate occurrence of variation in recording concentration by controlling the recording operation in accordance with an amount of scan movement.

Another object of the invention is to provide an image forming apparatus which can reduce electric power consumption by controlling the readout operation in accordance with an amount of scan movement.

Another object of the invention is to provide an image readout apparatus which can raise the degree of accuracy of a binary signal by comparing pixels which are located close to each other.

Other objects and features of the present invention will be apparent from the following detailed description in conjunction with the accompanying drawings.

DETAILED DESCRIPTION OF PREFERRED EMBODIMENTS

Figure 1:
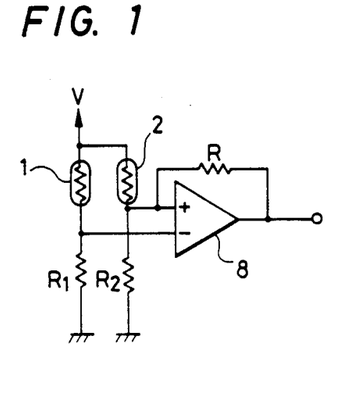
FIG. 1 is an equivalent circuit diagram of one embodiment of a sensor cell of a copy head according to the present invention.

One embodiment of the present invention will now be described hereinbelow with reference to the drawings. FIG. 1 shows an equivalent circuit diagram of one embodiment of a sensor cell of a copy head according to the present invention. Reference numerals 1 and 2 denote what are called photoconductive cells whose resistance values vary in dependence upon the intensity of incident light; R, $R_1$ and $R_2$ are respectively fixed resistors; and 8 is a comparator. A hysteresis comparator is constituted by the photoconductive cells 1 and 2 and fixed resistors R, $R_1$ and $R_2$. When it is now assumed that the photoconductive cell 1 is the photo sensor cell for detection which reads out image information which should be detected as pixel information and that the photoconductive cell 2 is the photo sensor cell for comparison which reads out, as pixel information, a near pixel located at a position that is delayed or advanced by one or more pixels from the pixel which is read out by the photoconductive cell 1 in the scan direction (sub-scan direction) of the apparatus, namely, image information on the same sub-scan line that is at least one or more lines away in the sub-scan direction, a binary coded output corresponding to a change in image regarding the sub-scan direction will be obtained as an output of the comparator 8.

Figure 2:
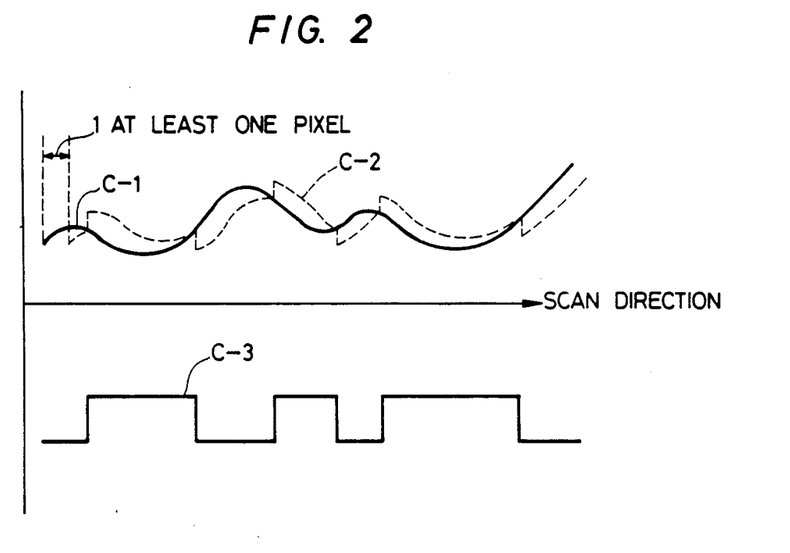
FIG. 2 shows an output waveform diagram of the comparator in FIG. 1.

FIG. 2 is a waveform diagram showing such an output state, in which C-1 denotes a voltage at a minus terminal of the comparator 8 which is developed by the photo sensor cell 1 for detection and C-2 indicates a voltage at a plug terminal of the comparator 8 which is caused by the photo sensor cell 2 for comparison. The chattering of the comparator 8 is prevented by the hysteresis, thereby producing a stable binary coded image signal C-3 from an output terminal of the comparator 8. In FIG. 2, the abscissa represents the scan direction (time). Although not shown, a heating resistor or the like or its driver is connected to the output of the comparator 8.

Figure 3:
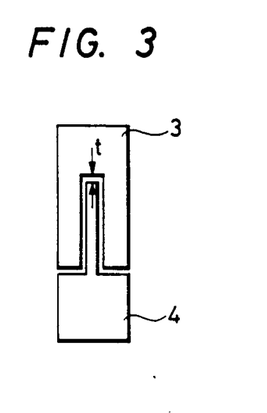
FIG. 3 is a diagram showing an example of an arrangement of a photo sensor according to the invention.

FIG. 3 is a diagram showing an example of an arrangement of the foregoing photo sensor cell. Photo sensitive material such as amorphous silicon, CdTe, CdS, or the like is coated on a glass substrate so as to form a thin film. Electrodes 3 and 4 are further formed over the glass substrate so as to have a gap t between these electrodes. The light reflected by an original is irradiated onto the photo sensitive material in the portion of the gap width t and an intensity of the light can be detected as a change in resistance value between the electrodes 3 and 4. In this embodiment, the gap width t is set to 5 μm and the whole length of the gap is set to about 250 μm and this resistance value changes within a range of $10^6$ to $10^7$ ohms (Ω) in dependence upon the light intensity.

Figure 4:
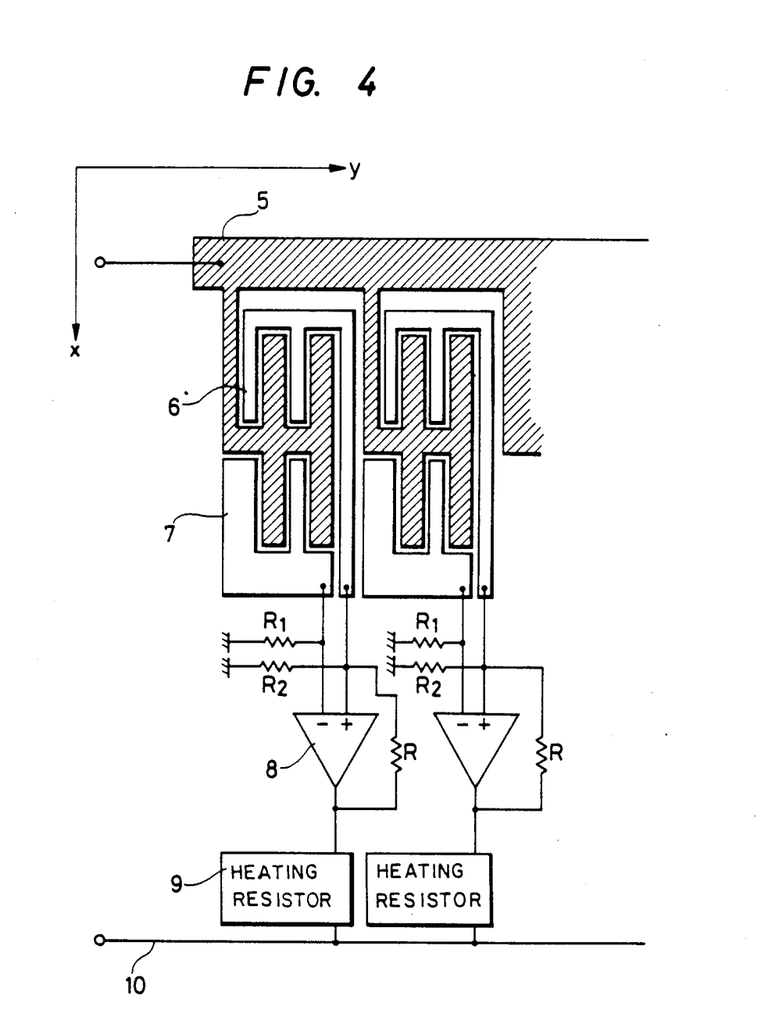
FIG. 4 is a diagram showing a structure of one embodiment of the photo sensor.

FIG. 4 shows one embodiment of an arrangement of the photo sensor cell. The sensor cell is constituted by electrodes 5, 6 and 7. That is, assuming that the x direction is the scan direction (sub-scan direction) of the apparatus and the y direction is the direction along which the cells are arranged (main-scan direction), the portion sandwiched by the electrodes 5 and 7 denotes the cell which is reading out image information at present, while the portion sandwiched by the electrodes 5 and 6 indicates the cell for reading out pixel information near the pixel information which is read out by the above-mentioned cell.

The electrode 7 is connected to the minus terminal of the comparator 8 and the electrode 6 is connected to the plus terminal of the comparator 8, respectively. Further, the electrode 5 is connected to a power source. Thus, the equivalent circuit shown in FIG. 1 is realized.

In order to completely separate the respective images which are read out by the cells formed near the electrodes 6 and 7, it is necessary to cover the portion other than the effective readout portion by a light shielding mask. Also, it is desirable to set the distance between the two cells to approximately the minimum unit for readout (for example, 63 μm in case of 16 pel).

The comparator circuit 8 can be easily formed by a TFT (thin film transistor) using the photo sensitive material of the sensor, for instance, using amorphous silicon or the like. In addition, since the above-described pixel processing block can be formed in the sub-scan direction x so as to become smaller than the width of a single sensor cell, it is possible to realize an elongated copy head having a length of 210 mm with a density of about 10 pel in the main-scan direction y.

A numeral 9 denotes a heating resistor and its driver and 10 is a power source line. The heating resistor 9 is driven in response to the binary coded output from the comparator 8, so that an image is formed.

Figure 5A:
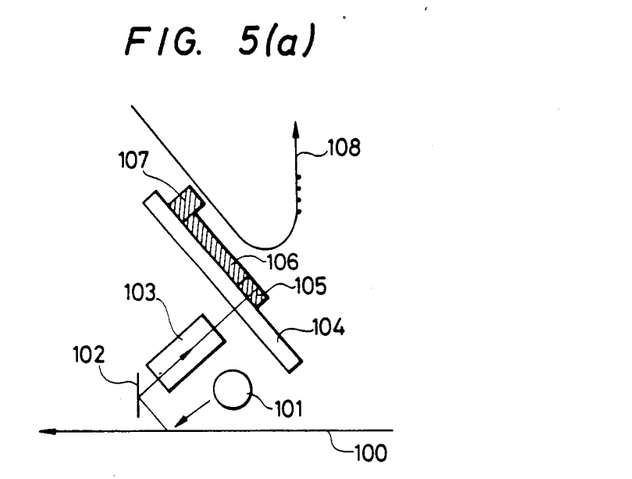
FIGS. 5(a) and 5(b) are diagrams of embodiments showing arrangements of simple copiers with which the copy head according to the invention is employed, respectively.
Figure 5B:
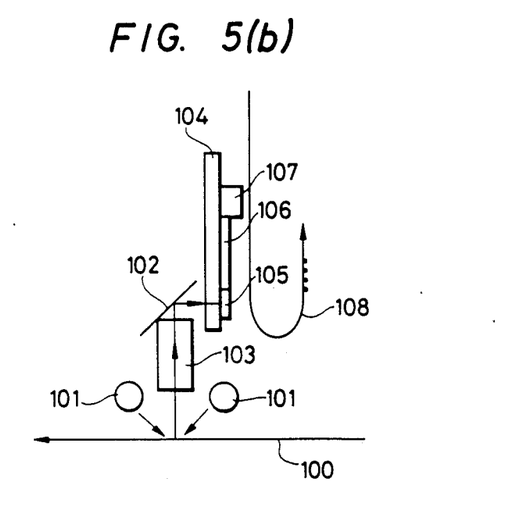

FIGS. 5(a) and 5(b) show embodiments of arrangements of simple copiers to which the copy head of this embodiment is applied. In both diagrams, a numeral 104 denotes a base plate of the copy head; 105 is a photo sensor section for reading out an image; 106 binary coding circuitry; and 107 a printing device (head). An image on an original 100 is illuminated by a light source 101 and is formed on the surface of the photo sensor section 105 on the substrate 104 of the copy head through a mirror 102 and a SELFOC lens 103. The image information is binary coded by the binary coding circuit 106. The printing head 107 is driven in accordance with this binary coded information, so that an image is reproduced on a recording paper 108.

The foregoing arrangement is merely an example and the invention is not limited to this arrangement; any arrangements of the light source, image forming system, printing head, and the like may be adopted.

There will now be described means for controlling a recording concentration by shifting a threshold value as a whole upon binary coding process in the foregoing embodiment.

Figure 6:
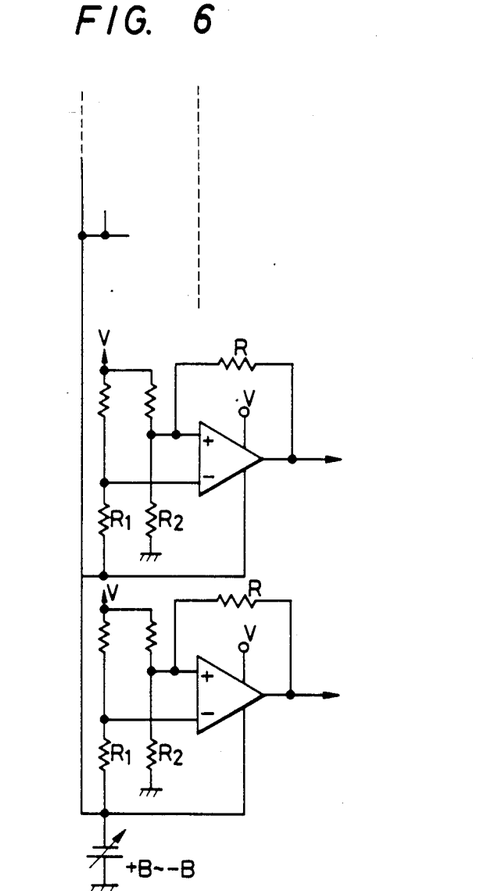
FIG. 6 shows another embodiment of a copy head circuit according to the invention.

The resistors R, $R_1$ and $R_2$ are the fixed resistors in FIG. 1. However, if either one of the two resistors $R_1$ and $R_2$ grounded from the input terminal of the comparator 8 is commonly connected with regard to all of the blocks and is connected to an external bias power source as shown in FIG. 6, either one of the signals C-1 and C-2 in FIG. 2 can be shifted as a whole by controlling the voltage of this bias power source; therefore, a binary coded threshold value regarding the image can be varied.

As described above, since the binary coded output is obtained due to comparison of the pixel which should be read out and the near pixel, the influence due to a fluctuation of light of the light source and a variation in scan velocity can be set off each other, so that the stable binary coded output can be derived.

On one hand, since the distance between the cell for detection and the cell for reference is short, variation in sensitivity of the cells becomes extremely so small that it does not affect the binary coding process.

In addition, since the sensor output of a high impedance can be binary coded with the shortest distance, there is no need to use any particular circuit for prevention of influence of noise or for other purpose, so that this makes it possible to realize miniaturization of the apparatus and improve the reliability.

The second embodiment according to the present invention will now be explained.

There has been considered an image forming apparatus such as what is called a handy type copier or the like in which an image is read out by manually scanning on an original and the image is formed on a paper which is fed synchronously with this scan. However, in such a kind of copier, the driving force from a roller which is rotated in pressure contact with the original due to the manual scan is transferred to a recording paper feeding section, so that a variation in scan velocity in association with the manual scan appears as a variation in paper feeding velocity in the relation of one-to-one correspondence.

On the other hand, a number of image readout sensors and printing heads (e.g., ink jet nozzles, heating resistors for thermal transfer copy or the like) are arranged in parallel in the scan direction and are respectively connected to each other in the one-to-one corresponding relation. Therefore, there is always the positional relation of one-to-one correspondence between the original image and the reproduced image with respect to each pixel, so that the image can be reproduced with high fidelity in principle. However, in this printing method, a concentration of the reproduced image actually varies in dependence upon its driving time. Therefore, for instance, in case of the printing head of heating resistor, there is the problem that the above-mentioned variation in manual scan velocity is reproduced as it is producing a variation in the reproduced image. Moreover, in case of the original having a wide black area, there is also another problem of a risk of fire due to an increase in temperature of the recording portion of the heating resistor.

This embodiment will now be described hereinbelow with reference to the drawings.

Figure 7:
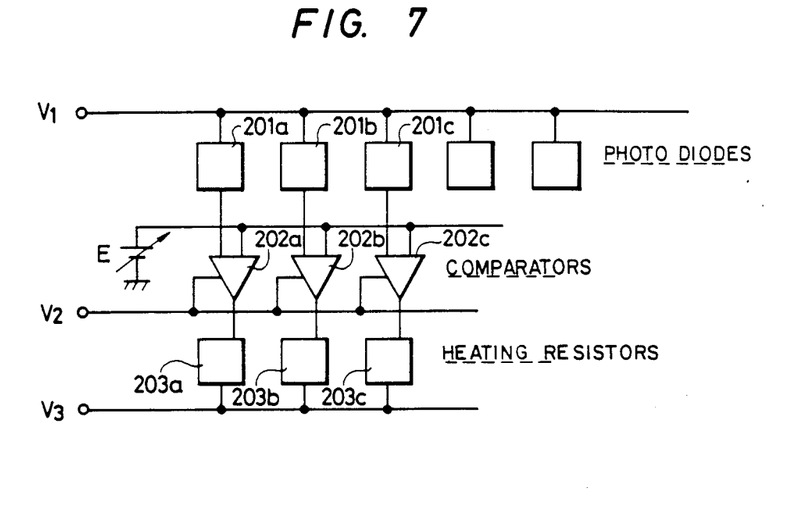
FIG. 7 is a diagram showing general arrangements of an image readout section and a printing head section to which the invention can be applied.

FIG. 7 is a diagram of a general arrangement to which the present invention can be applied, showing a number of image readout sections and printing head sections which are arranged perpendicularly in the scan direction and which are connected in the one-to-one corresponding relation for every pixel. A reference numeral 201 (201a, 201b, 201c, . . . ) denotes a photo diode for reading out an image; 202 (202a, 202b, 202c, . . . ) indicates a comparator for comparing the electromotive force of this photo diode with a constant voltage E and generating a binary image signal; and 203 (203a, $203b$, $203c$, . . . ) represents a heating resistor as a printing device which is driven and reproduced in response to the output of the comparator. They are highly densely arranged, respectively. Therefore, as long as the photo sensor $201a$, for example, is detecting that the original is black, the heating resistor $203a$ is continuously receiving electric power. Lines $V_1$, $V_2$ and $V_3$ are power source lines to supply power sources to the photo diodes 201, comparators 202 and heating resistors 203, respectively.

Figure 8:
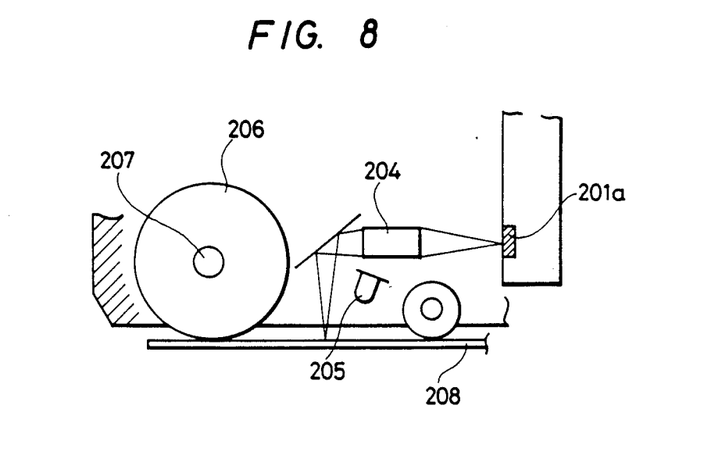
FIG. 8 is a cross sectional view showing schematically a scan section.

FIG. 8 is a cross sectional view showing schematically a scan section, in which a numeral 206 denotes a roller and 208 is an original. The original 208 is illuminated by an LED 205 as a light source and the reflected light of the original is formed as an original on the photo diode $201a$ through a SELFOC lens 204.

Figure 9:
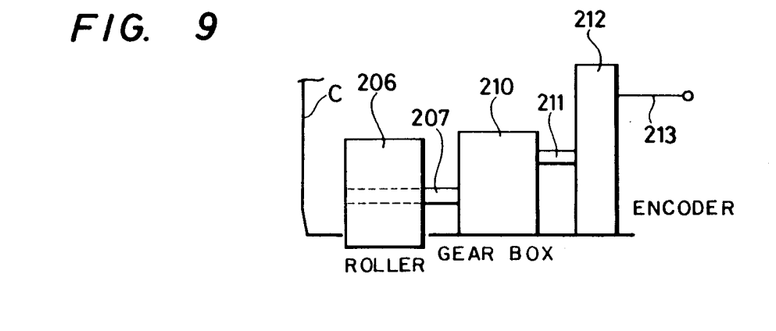
FIG. 9 is an arrangement diagram showing schematically a scan amount detecting mechanism of one embodiment of the invention.

FIG. 9 is an arrangement diagram showing schematically a mechanism for detecting an amount of scan. The rotation of an axis 207 of the roller 206 in association with the manual scan is converted to the high speed rotation by a gear box 210 and is coupled to a rotary encoder 212 through an axis 211. C indicates a casing of this mechanism. The gear box 210 is provided with a function to suppress the slip of the roller 206, so that an output 213 from the encoder 212 is a pulse indicative of an amount of movement relative to the original. In this embodiment, the output pulse 213 is a square pulse in which one period is equal to 100 $\mu$m of the amount of movement relative to the original.

Figure 10A:
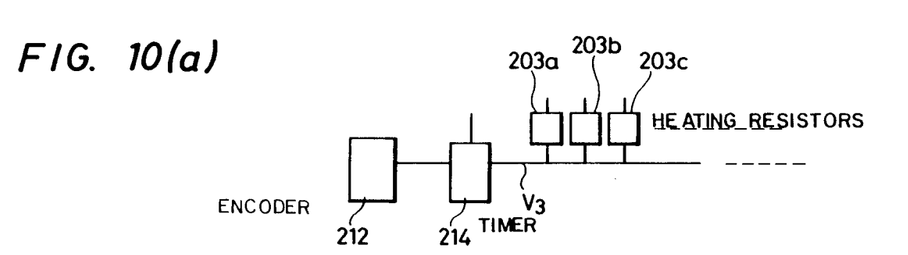
FIGS. 10(a) and 10(b) show a control block diagram of heating resistors of the invention and a timing chart for the operation thereof, respectively.
Figure 10B:
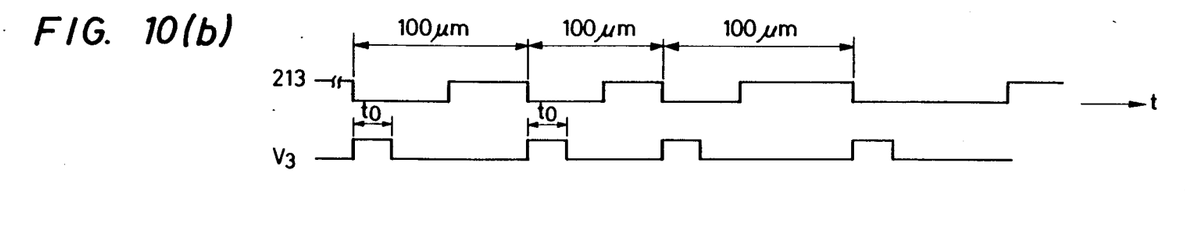

FIGS. 10($a$) and 10($b$) show a control block diagram for the heating resistors 203 by the output pulse 213 according to the present invention and a timing chart for the operation thereof, respectively. In the block diagram of FIG. 10($a$), a timer 214 is a circuit to turn on the power source of the heating resistors 203 for a constant time interval ($t_0$ seconds) synchronously with the trailing edge of the output pulse 213 of the encoder 212. Therefore, even if the manual scan velocity varies, each dot of the reproduced image will be always reproduced at the location in the relation of one-to-one correspondence to the original and the heating resistors 203 can always output the energy of a constant time, so that this makes it possible to reproduce an extremely clear image.

Although not described in detail, in the case where the output pulse period of the encoder 212 becomes less than the time (e.g., $t_0$ sec) necessary to form one dot due to an increase in scan velocity, a warning is made by indicating that the reproducing process is impossible. This warning may be performed in a manner such that for example, the trailing edge of the output pulse 213 is counted by a counter which is reset at every constant time ($t_0$) and a warning pulse is outputted when two trailing edges are counted.

On the other hand, a similar effect as in the above embodiment is derived even in another embodiment whereby the power source line $V_2$ of the comparator circuits 202 shown in FIG. 7 is controlled by the output of the timer circuit 214 in FIG. 10($a$). That is, this another embodiment may be constituted in a manner such that the comparator 202 is made operative for only a predetermined time $t_0$ whenever the scan advances by 100 $\mu$m and the driving signal is not outputted to the heating resistor 203 at the other times.

Figure 11A:
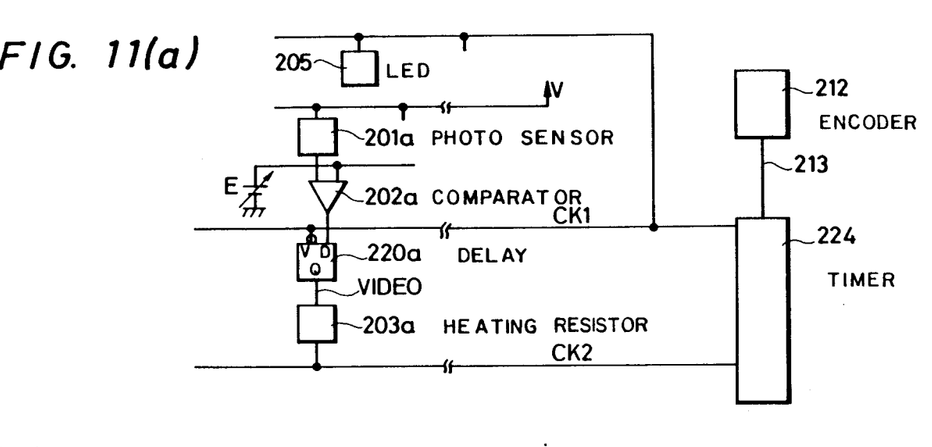
FIGS. 11(a) and 11(b) are a control block diagram of another embodiment of the invention and a timing chart for the operation thereof, respectively.
Figure 11B:
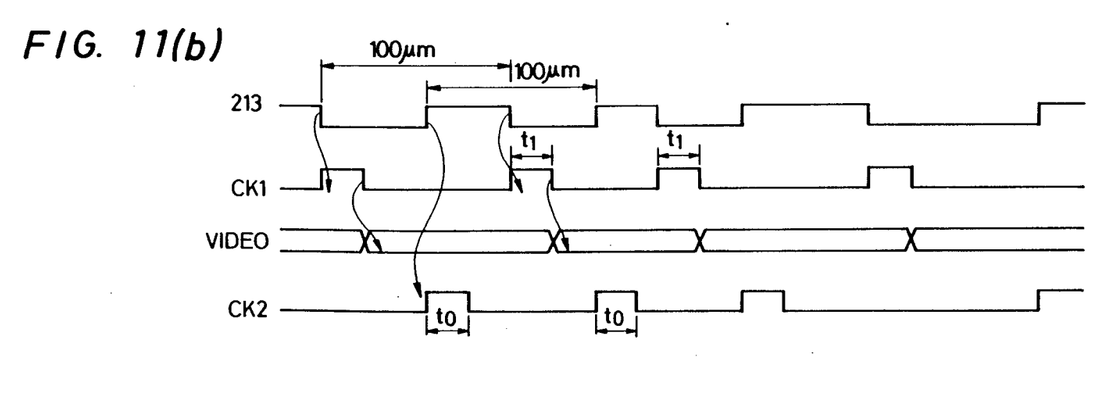

Further another embodiment will be explained with reference to FIGS. 11($a$) and 11($b$). FIG. 11($a$) shows a control block diagram and FIG. 11($b$) shows a timing chart for the operation thereof, in which the same parts and components as those in the foregoing embodiments are designated by the same reference numerals. In the timing chart of FIG. 11($b$), both the leading edge and trailing edge of the output pulse from the encoder 212 in FIG. 11($a$) are detected and pulses CK2 and CK1 which respectively have constant widths of $t_0$ sec and $t_1$ sec from both those edges are generated from a timer circuit 224. The light is emitted from the LED 205 as the light source for exposing the original for the interval of $t_1$ seconds of the pulse CK1, thereby illuminating the original. The reflected light is read out by the photo sensor $201a$ and the LED 205 is turned off, then the exposure is stopped. At the same time, the output of the comparator 202 is held in a delay flip flop $202a$. The flip flop $220a$ is set in response to the output of the comparator $202a$ and the input is made effective for only $t_1$ seconds in response to the output CK1 of the timer 224. The heating resistor 203 is driven in response to the CK2 for the interval of $t_0$ seconds as mentioned above in accordance with a video data Video which has been held.

In this embodiment, whenever the scan is performed by only a unit distance, the exposure of the original and the holding and printing of the data are continuously executed; therefore, the timings for the exposure of the original and for the printing can be completely shifted. This prevents unnecessary electric power consumption in the case of driving by a battery since the exposure is not continued during the manual scan.

In the foregoing respective embodiments, the case where the printing devices are the heating resistors has been described. However, the present invention is not limited to only such resistors, but a similar effect can be also derived even in the case of other types such as an ink jet printer or the like and the invention can be easily realized.

In addition, the readout sensors, binary coding process method or method of detecting an amount of scan is not limited to these of the foregoing embodiments. For example, as another method of detecting a scan amount, the invention can be also easily realized by a method whereby a disk on which a radial curve pattern was formed due to a photo etching process is attached onto the axis 207 of the roller 206 shown in FIG. 9 and this pattern is read out by an enlarged image forming system and a photo sensor or by use of an equal magnification image forming system and a CCD and an IC sensor.

On one hand, an amount of relative movement of the original is detected in the foregoing embodiments. However, since there is the positional relation of one-to-one correspondence between the original and the recording paper, a similar effect will be also obviously derived even if amounts of movements of these members are detected and controlled.

As described above, an amount of scan movement of the apparatus is detected and the driving operations of the light source and the image readout or printing head are synchronized for every unit movement amount. Consequently, it is possible to prevent a risk of fire and occurrence of a variation in concentration of the reproduced image in association with a fluctuation of the scan that is caused in case of an ordinary method whereby the printing is not performed on the basis of the movement of the recording paper. Also, an effect of a remarkable energy saving can be obtained in case of the battery driving method.

The present invention is not limited to the above-described embodiments, but many variations and modifications which are obvious to a person skilled in the art to which the invention pertains are deemed to lie within the spirit and scope of the appended claims.

What we claim is:

1. An image reading apparatus, comprising:
   a light source for lighting an original;
   reading means for reading the original exposed by said light source and outputting an image signal;
   converting means for converting the image signal from said reading means into a recording signal; and
   control means for controlling a condition of an exposure of said light source in response to a relative movement velocity between said reading means and the original.

2. An image reading apparatus according to claim 1, wherein said control means controls a lighting timing of said light source.

3. An image reading apparatus according to claim 1, wherein said control means controls a lighting timing of said light source in response to relative movement distance between said reading means and the original.

4. An image recording apparatus according to claim 1, wherein said light source is intermittently actuated.

5. An image recording apparatus according to claim 1, further comprising recording means for recording an image responding to the original onto a recording medium in response to an output from said converting means.

6. An image reading apparatus, comprising:
   first and second reading means for reading an original and outputting an image signal, wherein said first and second reading means read different respective images on the same scanning line in the scanning direction of the original; and
   converting means for comparing outputs of said first and second reading means and converting the output of said first reading means to a binary signal in response to the result of the comprising operation.

7. An image reading apparatus according to claim 6, wherein said first reading means and said second reading means are separated by at least one readout unit in a scan direction.

8. An image reading apparatus according to claim 6, wherein said first and second reading means are mounted on a substrate.

9. An image reading apparatus according to claim 6, wherein said second reading means reads an image adjacent to an image read by said first reading means.

10. An image reading apparatus according to claim 6, further comprising recording means for recording an image responding to the original onto a recording medium in response to an output from said converting means.

11. An image forming apparatus, comprising:
    reading means for reading an original and outputting an image signal;
    converting means for converting an output of said reading means to a recording signal;
    recording means for recording an image corresponding to the original on a recording medium in response to an output of said converting means;
    driving means for relatively moving, in a predetermined synchronous relation, said recording means and the recording medium in response to a relative movement velocity between said reading means and the original; and
    control means for controlling said recording means such that a recording density onto the recording medium regardless of a relative velocity between said reading means and the original,
    wherein said control means controls a power supply to said converting means.

12. A image forming apparatus according to claim 11, wherein said control means controls a power supply to said recording means.

13. A image forming apparatus according to claim 11, wherein said control means controls the time that power is supplied to said converting means.

14. An image forming apparatus according to claim 11 wherein said reading means reads the original and is such that the original can be manually scanned.

15. An image forming apparatus according to claim 12, wherein said control means controls the time that power is supplied to said recording means.

16. An image forming apparatus, comprising:
    reading means for reading an original and outputting an image signal;
    converting means for converting an output of said reading means to a recording signal;
    recording means for recording an image corresponding to the original on a recording medium in response to an output of said converting means;
    driving means for relatively moving, in a predetermined synchronous relation, said recording means and the recording medium in response to a relative movement velocity between said reading means and the original; and
    control means for controlling said recording means such that a recording density onto the recording medium regardless of a relatively between said reading means and the original,
    wherein said control means controls a timing for an operation of said recording means in response to a relative movement distance between said reading means and the original.

17. An image forming apparatus according to claim 16, wherein said reading means reads the original and is such that the original can be manually scanned therewith.

* * * * *